(12) United States Patent
Liu et al.

(10) Patent No.: US 9,673,716 B2
(45) Date of Patent: Jun. 6, 2017

(54) RESONANT CONVERTER WITH THREE SWITCHES

(71) Applicant: LITE-ON TECHNOLOGY CORP., Taipei (TW)

(72) Inventors: Yu-Chen Liu, Taipei (TW); Jing-Yuan Lin, Taipei (TW); Huang-Jen Chiu, Taipei (TW); Yu-Kang Lo, Taipei (TW); Po-Jung Tseng, Taipei (TW)

(73) Assignees: Lite-On Technology Corp., Taipei (TW); Lite-On Electronics (Guangzhou) Limited, Guangzhou (CN)

( * ) Notice: Subject to any disclaimer, the term of this patent is extended or adjusted under 35 U.S.C. 154(b) by 0 days.

(21) Appl. No.: 14/924,859

(22) Filed: Oct. 28, 2015

(65) Prior Publication Data

US 2016/0380548 A1     Dec. 29, 2016

(30) Foreign Application Priority Data

Jun. 26, 2015 (CN) .......................... 2015 1 0362114

(51) Int. Cl.
  *H02M 3/335* (2006.01)
  *H02M 1/00* (2006.01)

(52) U.S. Cl.
  CPC ... *H02M 3/33546* (2013.01); *H02M 3/33569* (2013.01); *H02M 2001/0058* (2013.01)

(58) Field of Classification Search
  CPC ......... H02M 3/33507; H02M 3/33546; H02M 3/33569; H02M 2001/0058
  See application file for complete search history.

(56) References Cited

U.S. PATENT DOCUMENTS

| | | | | |
|---|---|---|---|---|
| 3,711,747 A * | 1/1973 | Sahara | ..................... | H01F 29/02 307/17 |
| 3,745,440 A * | 7/1973 | Lord | ..................... | H01F 27/385 363/17 |
| 4,130,862 A * | 12/1978 | Holt | ..................... | H02M 3/3385 363/49 |
| 4,255,782 A * | 3/1981 | Joyce | ..................... | H02M 5/293 363/159 |
| 5,946,206 A * | 8/1999 | Shimizu | ................ | H02M 3/285 363/16 |
| 7,920,391 B1 * | 4/2011 | Vinciarelli | .............. | H02M 1/34 363/17 |
| 8,693,222 B2 * | 4/2014 | Yonezawa | ................ | H02M 1/34 363/21.12 |

(Continued)

*Primary Examiner* — Matthew Nguyen
*Assistant Examiner* — Yusef Ahmed
(74) *Attorney, Agent, or Firm* — Rosenberg, Klein & Lee (57) ABSTRACT

A resonant converter includes: a transformer including a first primary winding, a second primary winding and a secondary winding, each primary winding having a first end terminal and a second end terminal; a first switch coupled to the first end terminal of the first primary winding; a resonant inductor and a resonant capacitor connected in series between the second end terminal of the first primary winding and the first end terminal of the second primary winding; a second switch coupled between the first end terminals of the first and second primary windings; and a third switch coupled between the second end terminals of the first and second primary windings.

8 Claims, 8 Drawing Sheets

(56) References Cited

U.S. PATENT DOCUMENTS

| | | | | |
|---|---|---|---|---|
| 2002/0001203 A1* | 1/2002 | Jitaru | .................. | H02M 3/3376 |
| | | | | 363/17 |
| 2005/0047175 A1* | 3/2005 | Kawasaki | ......... | H02M 3/33569 |
| | | | | 363/16 |
| 2005/0226008 A1* | 10/2005 | Harada | ............... | H02M 3/3353 |
| | | | | 363/15 |
| 2006/0139970 A1* | 6/2006 | Cheng | .................. | H02M 3/3372 |
| | | | | 363/24 |
| 2006/0250822 A1* | 11/2006 | Nakagawa | .......... | H02M 3/3388 |
| | | | | 363/16 |
| 2012/0025720 A1* | 2/2012 | Chen | ..................... | H02M 3/337 |
| | | | | 315/185 R |
| 2012/0320638 A1* | 12/2012 | Boysen | ............... | H02M 3/3376 |
| | | | | 363/21.02 |
| 2014/0098572 A1* | 4/2014 | Scarlatescu | ....... | H02M 3/33584 |
| | | | | 363/16 |
| 2014/0232282 A1* | 8/2014 | Rooijackers | ...... | H02M 3/33523 |
| | | | | 315/200 R |
| 2014/0268904 A1* | 9/2014 | Reddy | ................... | H02M 3/337 |
| | | | | 363/21.02 |
| 2015/0049517 A1* | 2/2015 | Yan | .................. | H02M 3/33569 |
| | | | | 363/17 |
| 2015/0109831 A1* | 4/2015 | Ohashi | ............. | H02M 3/33507 |
| | | | | 363/21.06 |
| 2015/0229216 A1* | 8/2015 | Kyono | .................. | H02M 3/285 |
| | | | | 363/17 |
| 2016/0072388 A1* | 3/2016 | Dubus | ................. | H02M 3/1584 |
| | | | | 363/25 |

\* cited by examiner

RESONANT CONVERTER WITH THREE SWITCHES

CROSS-REFERENCE TO RELATED APPLICATION

This application claims priority of Chinese Application No. 201510362114.5, filed on Jun. 26, 2015.

FIELD

This disclosure relates to electrical power conversion, and more particularly to a resonant converter.

BACKGROUND

Conventional resonant converters generally perform electrical power conversion using a half bridge scheme (i.e., requiring two switches) or a full bridge scheme (i.e., requiring four switches). A conventional half bridge resonant converter is advantageously relatively low in cost, but disadvantageously has relatively low conversion efficiency. A conventional full bridge resonant converter advantageously has relatively high conversion efficiency, but is disadvantageously relatively high in cost.

SUMMARY

Therefore, an object of this disclosure is to provide a resonant converter that is moderate in cost and that has moderate conversion efficiency.

According to this disclosure, a resonant converter includes a transformer, a first switch, a resonant inductor, a resonant capacitor, a second switch and a third switch. The transformer includes a first primary winding, a second primary winding and a secondary winding. Each of the first and second primary windings has a first end terminal and a second end terminal. The first switch is coupled to the first end terminal of the first primary winding. The resonant inductor and the resonant capacitor are connected in series between the second end terminal of the first primary winding and the first end terminal of the second primary winding. The second switch is coupled between the first end terminals of the first and second primary windings. The third switch is coupled between the second end terminals of the first and second primary windings.

BRIEF DESCRIPTION OF THE DRAWINGS

Other features and advantages of this disclosure will become apparent in the following detailed description of the embodiment with reference to the accompanying drawings, of which.

DETAILED DESCRIPTION

Figure 1:
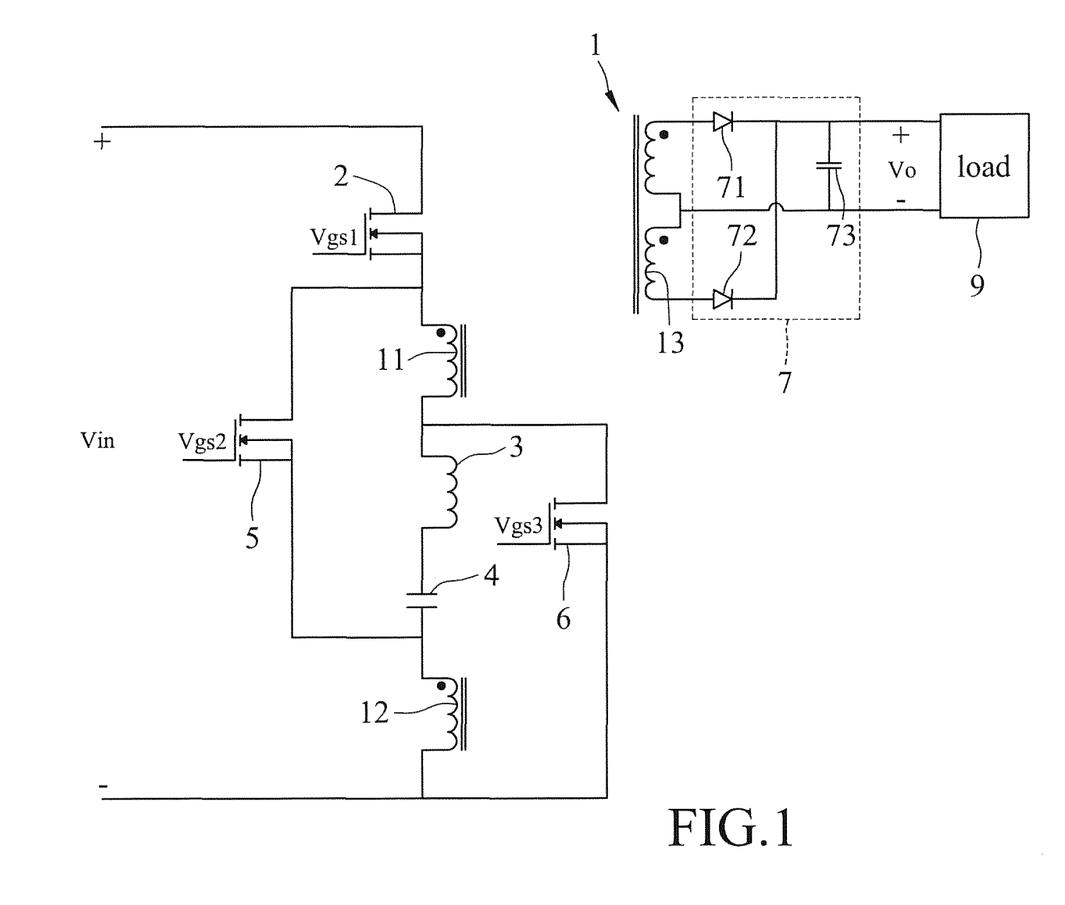
FIG. 1 is a circuit diagram illustrating an embodiment of a resonant converter according to this disclosure.

Referring to FIG. 1, an embodiment of a resonant converter according to this disclosure is a series resonant converter, is used to convert a direct current (DC) input voltage (Vin) into a DC output voltage (Vo) supplied to a load 9, and includes a transformer 1, a first switch 2, a resonant inductor 3, a resonant capacitor 4, a second switch 5, a third switch 6 and a rectifying-and-filtering circuit 7.

The transformer 1 includes a first primary winding 11, a second primary winding 12 and a secondary winding 13. Each of the first and second primary windings 11, 12 and the secondary winding 13 has a first end terminal and a second end terminal. The secondary winding 13 further has an intermediate terminal. In this embodiment, the first and second primary windings 11, 12 have the same number of turns, the first end terminals of the first and second primary windings 11, 12 have the same voltage polarity, and the secondary winding 13 is a center tapped winding.

The first switch 2 is coupled to the first end terminal of the first primary winding 11. In this embodiment, the first switch 2 is an N-type metal oxide semiconductor field effect transistor, and has a drain terminal, a source terminal that is coupled to the first end terminal of the first primary winding 11, and a gate terminal that receives a first control signal (Vgs1).

The resonant inductor 3 and the resonant capacitor 4 are connected in series between the second end terminal of the first primary winding 11 and the first end terminal of the second primary winding 12. In this embodiment, the resonant inductor 3 has one end connected to the second end terminal of the first primary winding 11 and another end connected to the resonant capacitor 4, and the resonant capacitor 4 is connected between said another end of the resonant inductor 3 and the first end terminal of the second primary winding 12.

The second switch 5 is coupled between the first end terminals of the first and second primary windings 11, 12. In this embodiment, the second switch 5 is an N-type metal oxide semiconductor field effect transistor, and has a drain terminal that is coupled to the first end terminal of the first primary winding 11, a source terminal that is coupled to the first end terminal of the second primary winding 12, and a gate terminal that receives a second control signal (Vgs2).

The third switch 6 is coupled between the second end terminals of the first and second primary windings 11, 12. In this embodiment, the third switch 6 is an N-type metal oxide semiconductor field effect transistor, and has a drain terminal that is coupled to the second end terminal of the first primary winding 11, a source terminal that is coupled to the second end terminal of the second primary winding 12, and a gate terminal that receives a third control signal (Vgs3).

Figure 2:
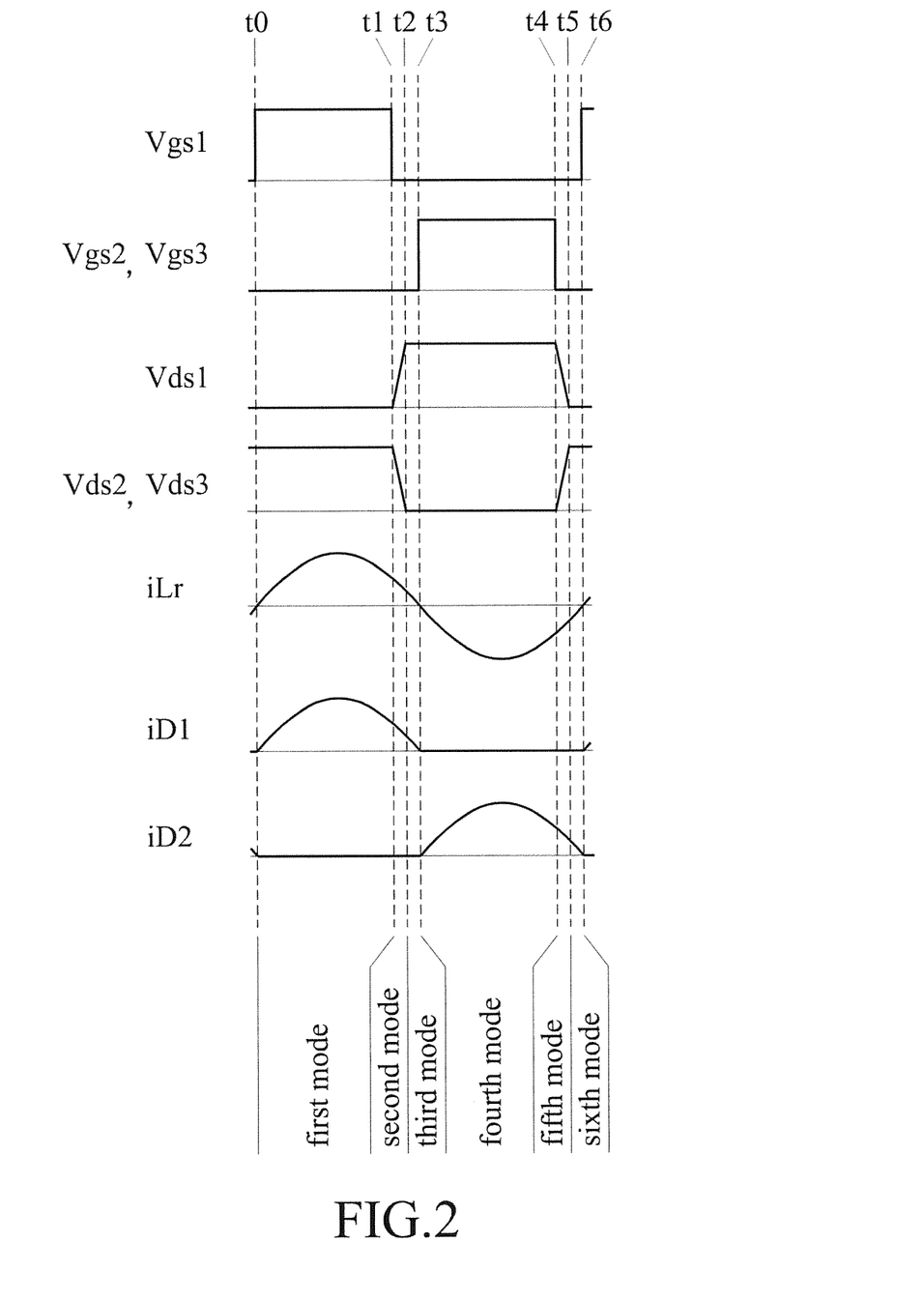
FIG. 2 is a timing diagram illustrating operation of the embodiment of the resonant converter.

The DC input voltage (Vin) is received at the drain terminal of the first switch 2 and the second end terminal of the second primary winding 12. As shown in FIG. 2, each of the first, second and third switches 2, 5, 6 is operated alternately in an ON state and an OFF state based on the respective control signal (Vgs1, Vgs2, Vgs3). In particular, the second and third switches 5, 6 are simultaneously in the OFF state when the first switch 2 is in the ON state, and the first switch 2 is in the OFF state when the second and third switches 5, 6 are simultaneously in the ON state. As a result, the DC input voltage (Vin) is converted into an alternating current (AC) voltage outputted at the first and second end terminals of the secondary winding 13.

The rectifying-and-filtering circuit 7 is coupled to the secondary winding 13 for receiving the AC voltage therefrom, and for rectifying and filtering the AC voltage to generate the DC output voltage (Vo). In this embodiment, the rectifying-and-filtering circuit 7 includes a first diode 71 and a second diode 72 that are used for rectification, and an output capacitor 73 that is used for filtering. The first diode 71 has an anode that is coupled to the first end terminal of the secondary winding 13, and a cathode. The second diode 72 has an anode that is coupled to the second end terminal of the secondary winding 13, and a cathode that is coupled to the cathode of the first diode 71. The output capacitor 73 is coupled between the cathode of the first diode 71 and the intermediate terminal of the secondary winding 13, and a voltage thereacross serves as the DC output voltage (Vo).

Referring to FIGS. 2 to 8, the resonant converter of this embodiment operates sequentially in first to sixth modes during each switching cycle from time t0 to time t6. FIG. 2 depicts the first, second and third control signals (Vgs1, Vgs2, Vgs3), voltages (Vds1, Vds2, Vds3) respectively across the first, second and third switches 2, 5, 6, and currents (iLr, iD1, iD2) flowing respectively through the resonant inductor 3 and the first and second diodes 71, 72. It is noted that, in FIG. 2, a waveform of each current (iLr, iD1, iD2) conveys information regarding both a magnitude and a direction of the current (i.e., positive and negative values of the current indicate opposite directions of the current), and in FIGS. 3 to 8, the direction of each current (iLr, iD1, iD2) is shown by a corresponding arrow. In addition, in FIGS. 3 to 8, an intrinsic diode 21, 51, 61 and a parasitic capacitor 22, 52, 62 of each of the first, second and third switches 2, 5, 6 are depicted, conducting components are depicted by solid lines, and non-conducting components are depicted by doted lines.

Figure 3:
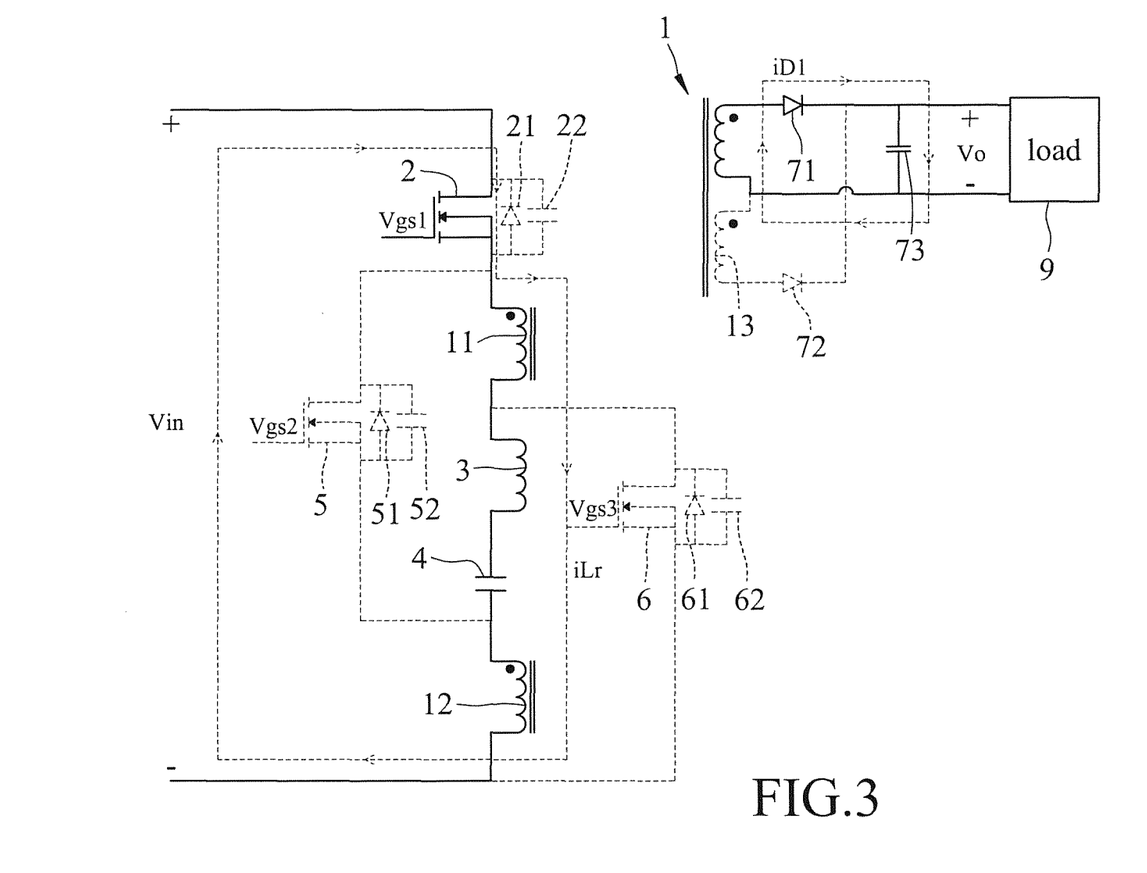
FIGS. 3 to 8 are equivalent circuit diagrams illustrating the embodiment of the resonant converter operating in first to sixth modes, respectively.

Referring to FIGS. 2 and 3, the resonant converter of this embodiment operates in the first mode during a period from time t0 to time t1. In the first mode, the first switch 2 enters the ON state with zero voltage switching, and the second and third switches 5, 6 are in the OFF state. The magnitude of the current (iLr) flowing through the resonant inductor 3 gradually increases from zero to its maximum value, and then gradually decreases. Energy is delivered to the load 9 through the transformer 1 and the first diode 71, the magnitude of the current (iD1) flowing through the first diode 71 gradually increases from zero to its maximum value and then gradually decreases, and the current (iD2) flowing through the second diode 72 is zero.

Figure 4:
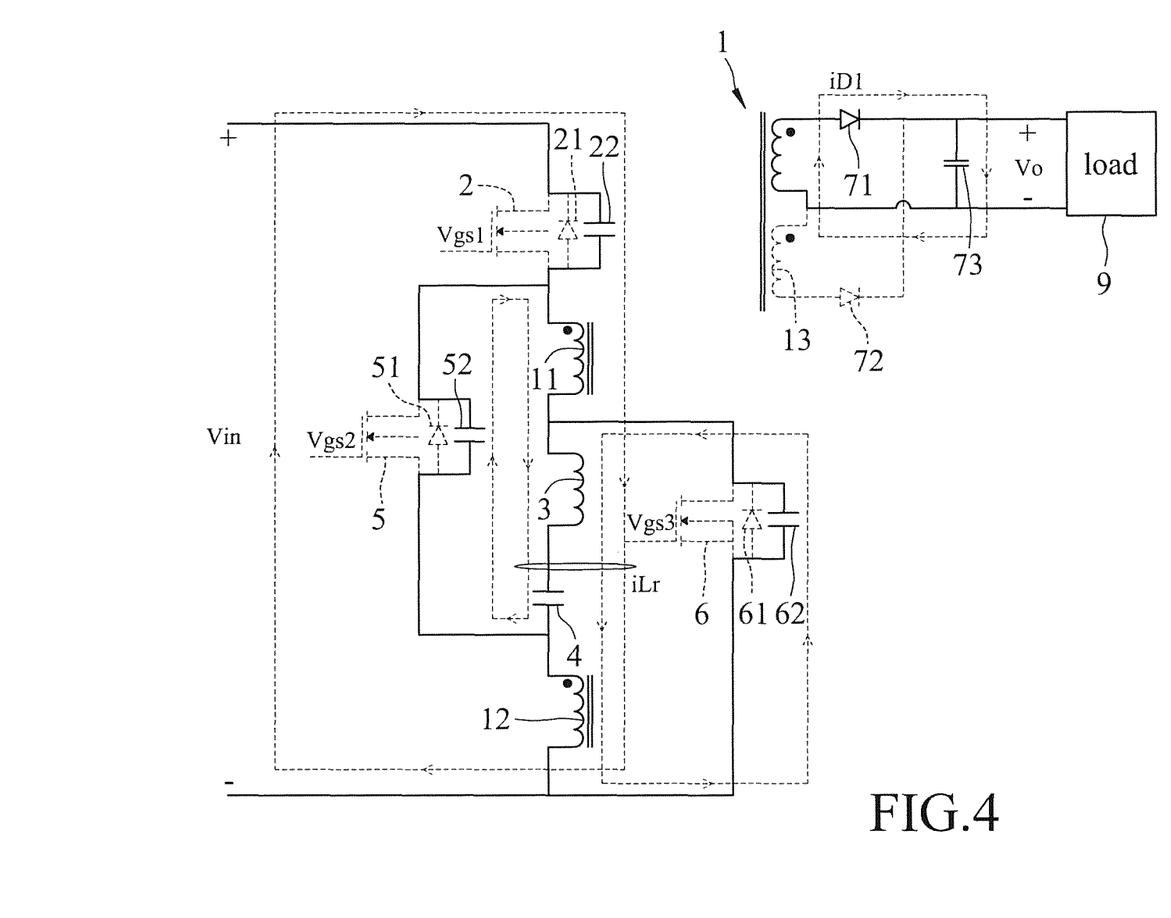

Referring to FIGS. 2 and 4, the resonant converter of this embodiment operates in the second mode during a period from time t1 to time t2. In the second mode, the first switch 2 enters the OFF state, and the second and third switches 5, 6 remain in the OFF state. The current (iLr) flowing through the resonant inductor 3 continuously and gradually decreases in magnitude. Energy is delivered to the load 9 through the transformer 1 and the first diode 71, the magnitude of the current (iD1) flowing through the first diode 71 continuously and gradually decreases, and the current (iD2) flowing through the second diode 72 is still zero. The parasitic capacitor 22 of the first switch 2 is charged such that the voltage (Vds1) across the first switch 2 increases to ($4/3$)×Vin. The parasitic capacitors 52, 62 of the second and third switches 5, 6 are discharged such that the voltages (Vds2, Vds3) respectively across the second and third switches 5, 6 decrease to zero, thereby reaching a zero voltage switching condition for each of the second and third switches 5, 6.

Figure 5:
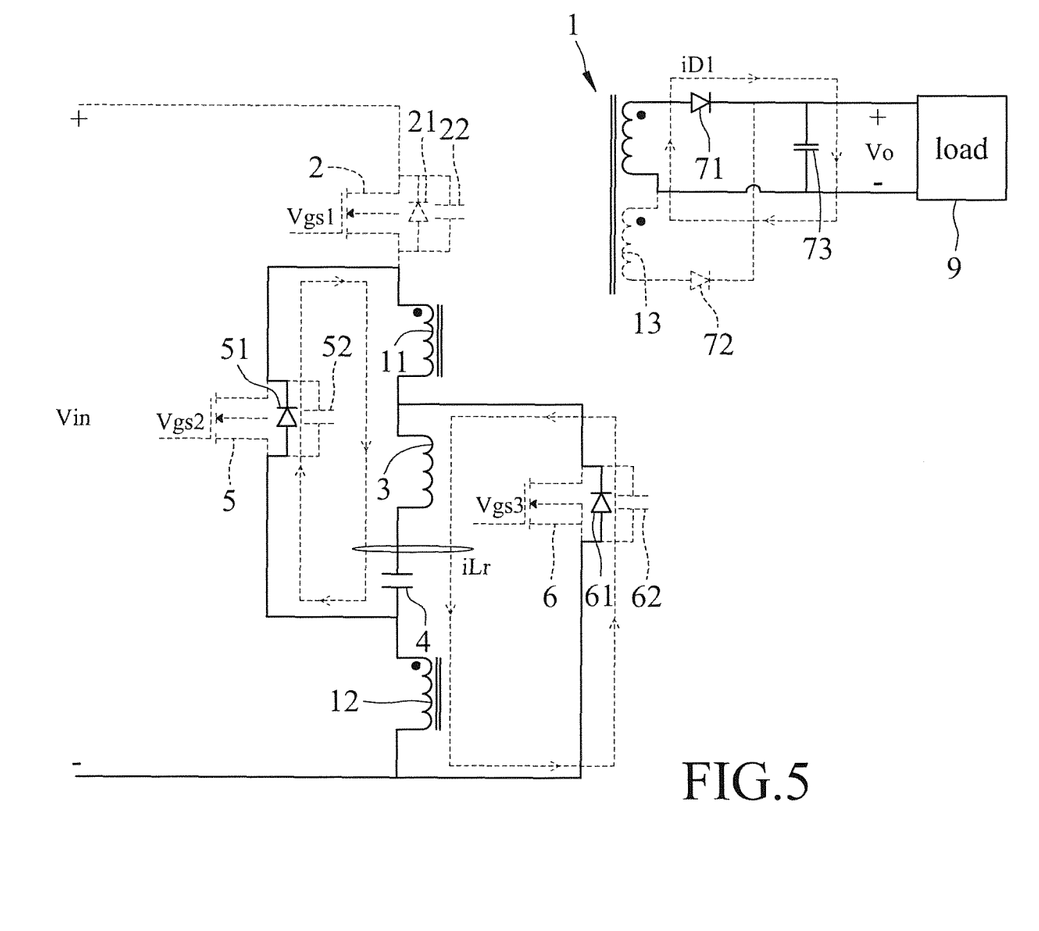

Referring to FIGS. 2 and 5, the resonant converter of this embodiment operates in the third mode during a period from time t2 to time t3. In the third mode, the first, second and third switches 2, 5, 6 all remain in the OFF state. The current (iLr) flowing through the resonant inductor 3 continuously and gradually decreases in magnitude to zero. Energy is delivered to the load 9 through the transformer 1 and the first diode 71, the magnitude of the current (iD1) flowing through the first diode 71 continuously and gradually decreases to zero, and the current (iD2) flowing through the second diode 72 remains at zero. The intrinsic diodes 51, 61 of the second and third switches 5, 6 conduct such that the voltages (Vds2, Vds3) respectively across the second and third switches 5, 6 remain at zero.

Figure 6:
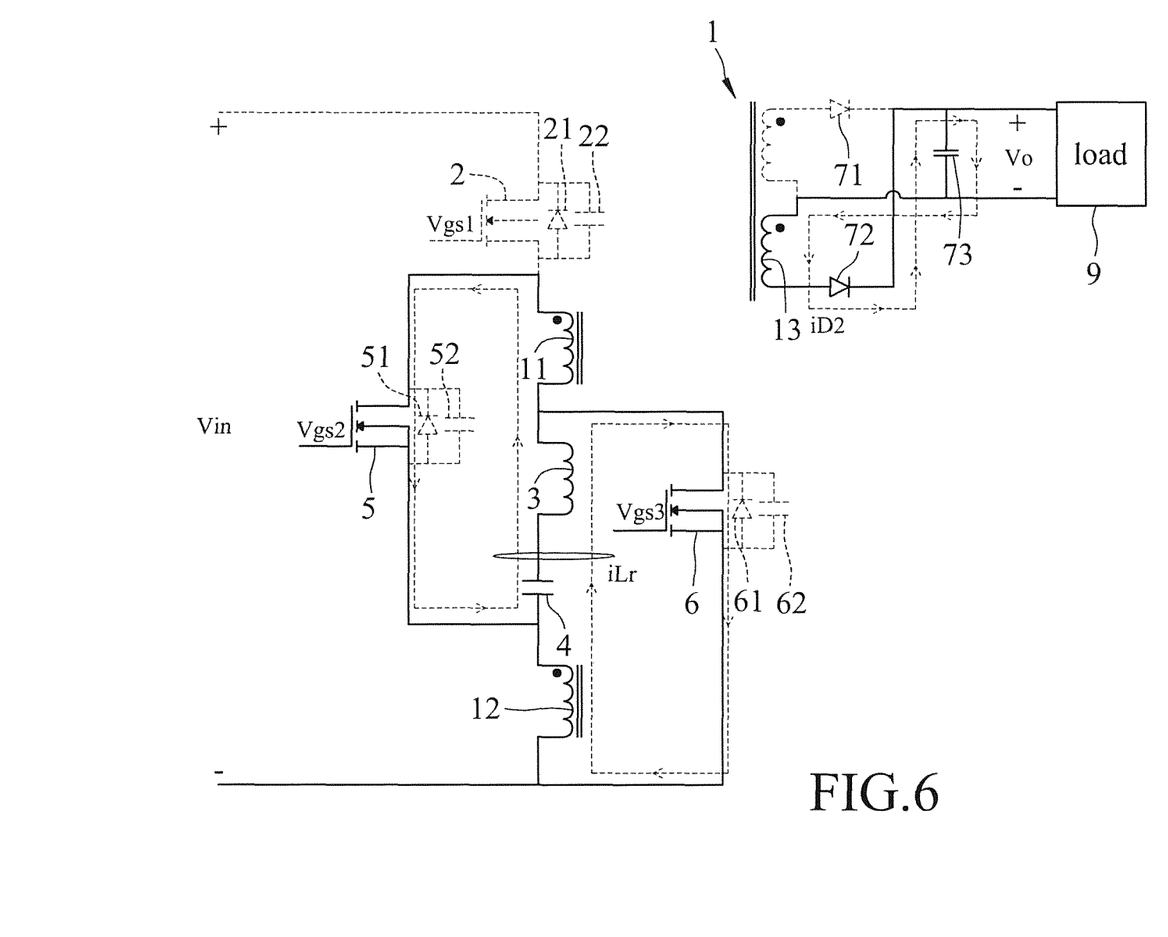

Referring to FIGS. 2 and 6, the resonant converter of this embodiment operates in the fourth mode during a period from time t3 to time t4. In the fourth mode, the first switch 2 remains in the OFF state, and the second and third switches 5, 6 simultaneously enter the ON state with zero voltage switching. The magnitude of the current (iLr) flowing through the resonant inductor 3 gradually increases from zero to its maximum value, and then gradually decreases. The direction of the current (iLr) in the fourth mode is opposite to that in the first to third modes. Energy is delivered to the load 9 through the transformer 1 and the second diode 72, the magnitude of the current (iD2) flowing through the second diode 72 gradually increases from zero to its maximum value and then gradually decreases, and the current (iD1) flowing through the first diode 71 is zero.

Figure 7:
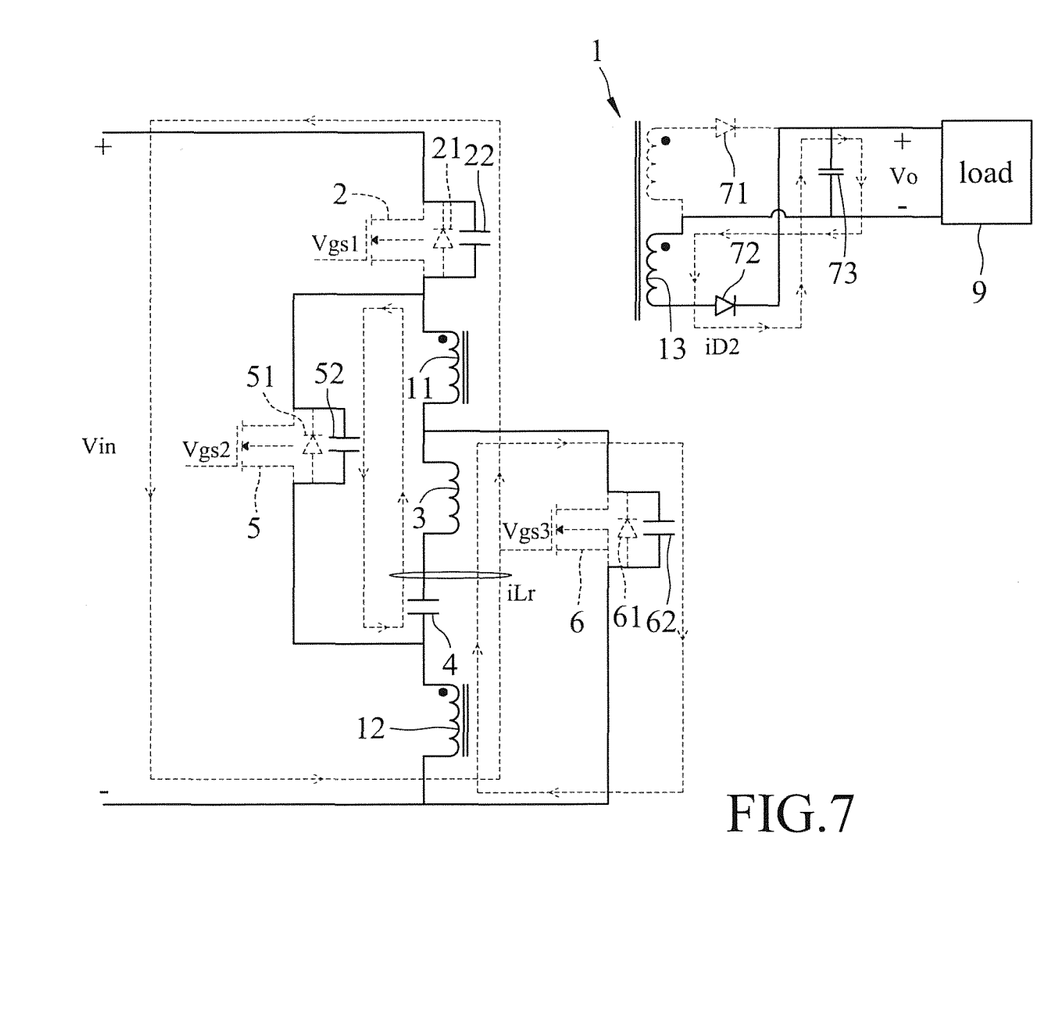

Referring to FIGS. 2 and 7, the resonant converter of this embodiment operates in the fifth mode during a period from time t4 to time t5. In the fifth mode, the first switch 2 remains in the OFF state, and the second and third switches 5, 6 simultaneously enter the OFF state. The current (iLr) flowing through the resonant inductor 3 continuously and gradually decreases in magnitude. Energy is delivered to the load 9 through the transformer 1 and the second diode 72, the magnitude of the current (iD2) flowing through the second diode 72 continuously and gradually decreases, and the current (iD1) flowing through the first diode 71 is still zero. The parasitic capacitor 22 of the first switch 2 is discharged such that the voltage (Vds1) across the first switch 2 decreases to zero, thereby reaching a zero voltage switching condition for the first switch 2. The parasitic capacitors 52, 62 of the second and third switches 5, 6 are charged such that the voltages (Vds2, Vds3) respectively across the second and third switches 5, 6 increase to ($2/3$)×Vin.

Figure 8:
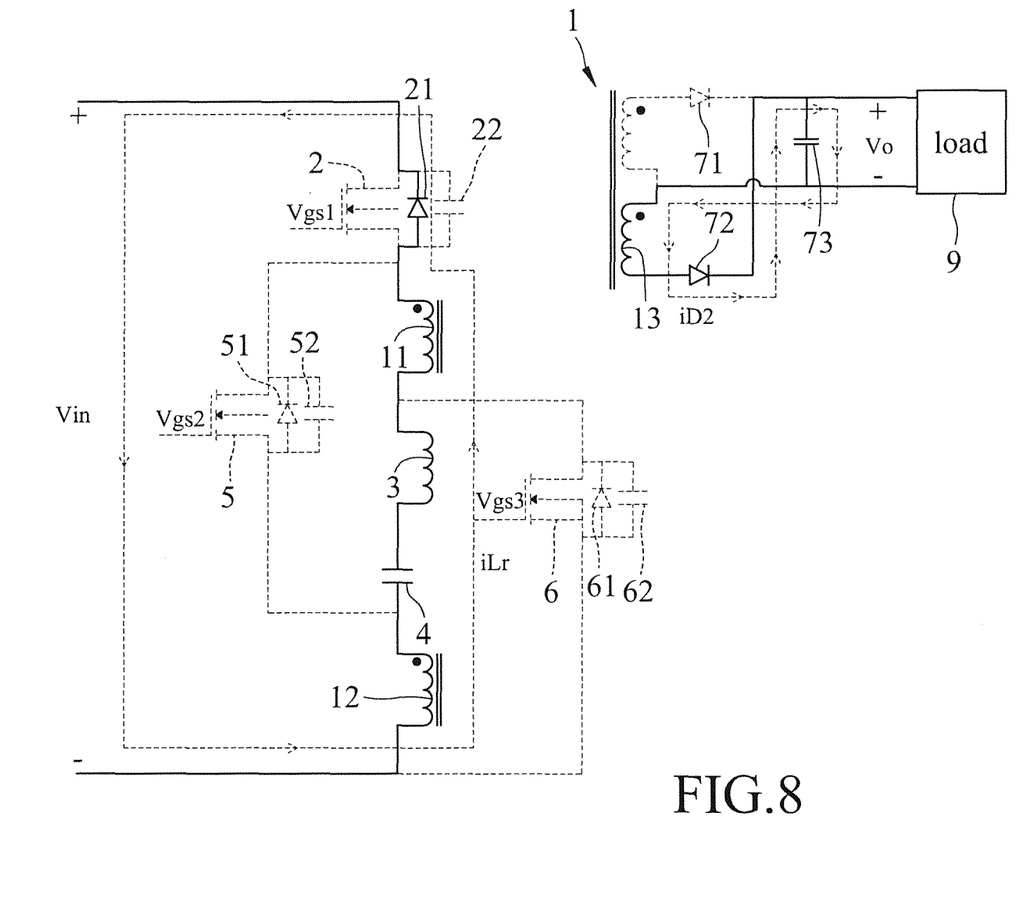

Referring to FIGS. 2 and 8, the resonant converter of this embodiment operates in the sixth mode during a period from time t5 to time t6. In the sixth mode, the first, second and third switches 2, 5, 6 all remain in the OFF state. The current (iLr) flowing through the resonant inductor 3 continuously and gradually decreases in magnitude to zero. Energy is delivered to the load 9 through the transformer 1 and the second diode 72, the magnitude of the current (iD2) flowing through the second diode 72 continuously and gradually decreases to zero, and the current (iD1) flowing through the first diode 71 remains at zero. The intrinsic diode 21 of the first switch 2 conducts such that the voltage (Vds1) across the first switch 2 remains at zero.

Referring to FIG. 1, in application, a switching frequency of the first, second and third switches 2, 5, 6 may equal or approximate a resonant frequency that depends on: (a) a sum of an inductance of the resonant inductor 3, a leakage inductance of the first primary winding 11 of the transformer 1 and a leakage inductance of the second primary winding 12 of the transformer 1; and (b) a capacitance of the resonant capacitor 4. In addition, in order to stabilize the DC output voltage (Vo) at a target value, the switching frequency is variable and is adjusted based on a condition of the load 9, or the switching frequency is constant and the DC input voltage (Vin) is adjusted based on the condition of the load 9.

In view of the above, the resonant converter of this embodiment has the following advantages:

1. Since three switches (i.e., the first to third switches 2, 5, 6) are required, the resonant converter of this embodiment has moderate conversion efficiency (i.e., higher than the conversion efficiency of the conventional half bridge resonant converter, but lower than the conversion efficiency of the conventional full bridge resonant converter), and moderate costs (i.e., greater than the costs of the conventional half bridge resonant converter, but lower than the costs of the conventional full bridge resonant converter).

2. Since a maximum value of each of the voltages respectively across the second and third switches 5, 6 is about ($2/3$)×Vin, each of the second and third switches 5, 6 endures relative low voltage stress as compared to the switches of the conventional half bridge and full bridge resonant converters.

3. The voltage across each of the first and second primary windings 11, 12 of the transformer 1 has an amplitude of about ($1/3$)×Vin. Therefore, as compared to a transformer of the conventional half bridge resonant converter, a turn ratio of the first primary winding 11 to the secondary winding 13 and a turn ratio of the second primary winding 12 to the secondary winding 13 are relatively small, and each of the first and second primary windings 11, 12 endures relatively low current stress. In addition, as compared to the switches of the conventional half bridge resonant converter, each of the second and third switches 5, 6 endures relatively low current stress, resulting in relatively low conduction loss.

4. Zero voltage switching can be achieved.

While this disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A resonant converter comprising:
   a transformer including a first primary winding, a second primary winding and a secondary winding, each of said first and second primary windings having a first end terminal and a second end terminal;
   a first switch coupled to said first end terminal of said first primary winding;
   a resonant inductor and a resonant capacitor connected in series between said second end terminal of said first primary winding and said first end terminal of said second primary winding;
   a second switch coupled between said first end terminals of said first and second primary windings; and
   a third switch coupled between said second end terminals of said first and second primary windings,
   wherein each of said first to third switches is operated alternately in an ON state and an OFF state, said second and third switches are simultaneously in the OFF state when said first switch is in the ON state, and said first switch is in the OFF state when said second and third switches are simultaneously in the ON state.

2. The resonant converter of claim 1, wherein said first end terminals respectively of said first and second primary windings have the same voltage polarity.

3. The resonant converter of claim 1, wherein said first and second primary windings of said transformer have the same number of turns.

4. The resonant converter of claim 1, wherein said resonant inductor is connected to said second end terminal of said first primary winding, and said resonant capacitor is connected to said first end terminal of said second primary winding.

5. The resonant converter of claim 1, further comprising a rectifying-and-filtering circuit coupled to said secondary winding of said transformer.

6. The resonant converter of claim 5, wherein:
   said secondary winding of said transformer has a first end terminal, a second end terminal and an intermediate terminal; and
   said rectifying-and-filtering circuit includes
   a first diode having an anode that is coupled to said first end terminal of said secondary winding, and a cathode,
   a second diode having an anode that is coupled to said second end terminal of said secondary winding, and a cathode that is coupled to said cathode of said first diode, and
   an output capacitor coupled between said cathode of said first diode and said intermediate terminal of said secondary winding.

7. The resonant converter of claim 6, wherein said secondary winding of said transformer is a center tapped winding.

8. The resonant converter of claim 1, wherein each of said first to third switches is an N-type metal oxide semiconductor field effect transistor.

* * * * *